Figure 1:
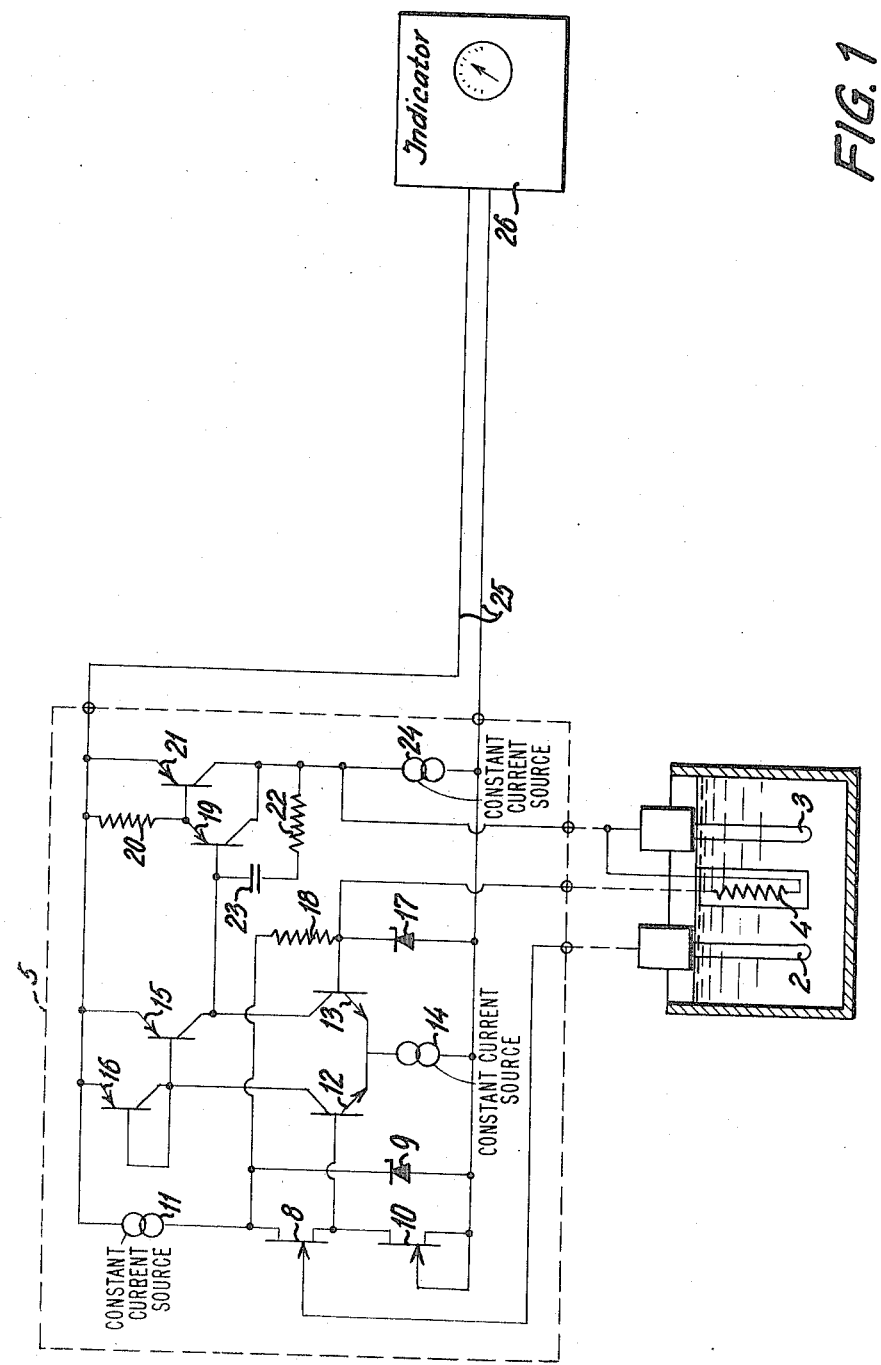

United States Patent [19]
Mikkelsen

[11] 3,786,345
[45] Jan. 15, 1974

[54] MEASURING EQUIPMENT, ESPECIALLY FOR MEASURING THE PH-VALUE OF A LIQUID

[75] Inventor: Stig Glerup Mikkelsen, Herlev, Denmark

[73] Assignee: Radiometer A/S, Copenhagen, Denmark

[22] Filed: June 18, 1971

[21] Appl. No.: 154,511

[52] U.S. Cl............ 324/30 R, 324/118, 324/123 R
[51] Int. Cl....................... G01n 27/42, G01r 19/18
[58] Field of Search...................... 324/30 R, 123 R, 324/118, 125, 30 C

[56] References Cited
UNITED STATES PATENTS
| | | | |
|---|---|---|---|
| 3,159,783 | 12/1964 | Sparnaay et al. | 324/30 C |
| 3,430,130 | 2/1969 | Schneider | 324/30 |

FOREIGN PATENTS OR APPLICATIONS
| | | | |
|---|---|---|---|
| 463,370 | 7/1936 | Great Britain | 324/72.5 |

OTHER PUBLICATIONS
Wilson, A. R., et al.; "Tracer Uses Tube . . ."; Radio—Electronik Nov. 1949; pg. 37.

*Primary Examiner*—Rudolph V. Rolinec
*Assistant Examiner*—Ernest F. Karlsen
*Attorney*—Stevens, Davis, Miller & Mosher

[57] ABSTRACT

A measuring equipment is disclosed, in which a physical quantity to be measured is transformed into an electrical magnitude, such as a voltage or a current, and as such amplified in an amplifier and transferred via a two-wire cable to a device for indicating, recording or in other ways utilizing the result of the measurement, wherein the transfer cable simultaneously is used to supply the power to the amplifier in that the information concerning the measurement is converted into a current forming part of the supply current to the amplifier. Further disclosed in such equipment, is a galvanic separation which is provided in the two-wire cable for supplying power to the amplifier and for transferring the information to the utilizing device.

6 Claims, 2 Drawing Figures

MEASURING EQUIPMENT, ESPECIALLY FOR MEASURING THE PH-VALUE OF A LIQUID

The invention relates to measuring equipment for measuring a physical quantity which is transformed into an electric magnitude, e.g., a voltage or a current, which is then transferred to a utilizing device, in which it is utilized in some way or other, for instance by being displayed or recorded or by being used to control a process. The means by which the quantity to be measured is transformed into the electrical magnitude may be, but is not necessarily, electro-chemical electrodes. The physical quantity to be measured may for instance be the pH-value of a liquid.

In many cases, e.g., when measuring the pH-value of a liquid by means of electro-chemical electrodes such as glass electrodes, the electric magnitude to be transferred to the utilizing device is a small electric voltage from a source having a high internal impedance. In such a case severe requirements are imposed on the transfer cable in order to obtain a transfer of the small voltage free of interferences and undue losses. Furthermore the electrodes are often vulnerable and care should therefore be taken that they are not damaged by voltage transients and other interferences on the transfer cable.

These disadvantages are avoided in a known equipment in which the electrodes are united with an impedance transformer and amplifier so that a low quality, unscreened two-wire transfer cable can be used. However, the known equipment has a serious disadvantage in that the electrical power to the impedance transformer and the amplifier is taken from an electrical dry cell battery, which has to be provided inside the amplifier and must be exchanged from time to time.

It is an object of the present invention to provide a measuring equipment of the type specified in which it is possible to use an unscreened two-wire transfer cable as the sole connection between the amplifier and the utilizing device and at the same time avoid the need of a battery in the amplifier.

It is another object of the invention to provide equipment in which the amplifier and the measuring electrodes have a floating potential in relation to the power supply which feeds the amplifier.

It is a further object of the invention to provide equipment in which a temperature compensation of the measured quantity can be obtained in a simple manner.

In accordance with the present invention the amplifier is adapted to transform the electrical magnitude representative of the quantity to be measured into a corresponding value of the supply current to its supply terminals so that the supply current will vary in accordance with the quantity to be measured and can therefore be utilized in the utilizing device, as an indication of the quantity to be measured.

A simple device providing a galvanic separation may be inserted in the transfer cable. By this device a galvanic separation is obtained in respect of both the signal transfer and the power transfer.

Further advantages and features of the present invention will appear from the subsequent description of some embodiments of the measuring equipment according to the invention in connection with the drawing.

Figure 2:
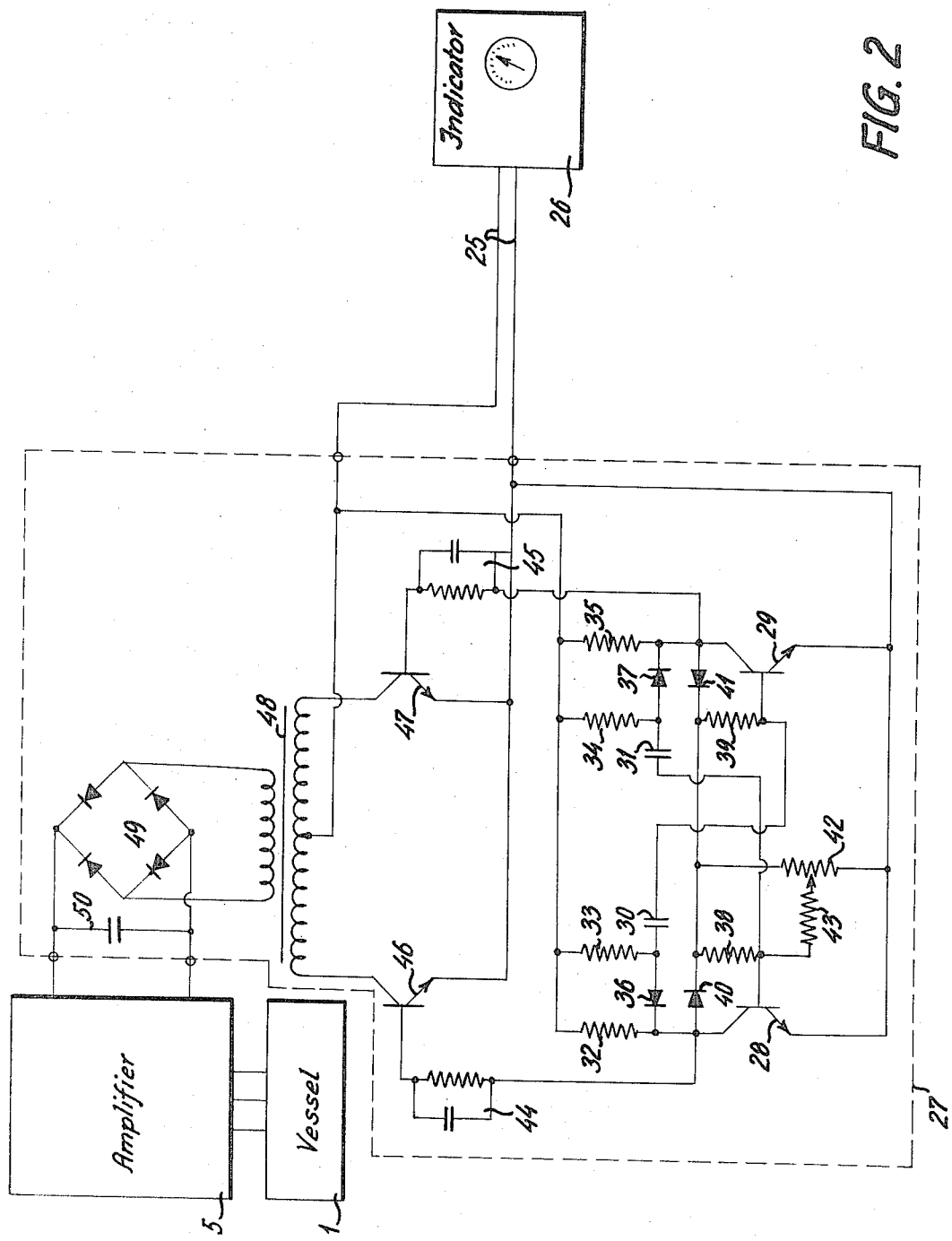

In the drawing,

FIG. 1 shows an embodiment of measuring equipment according to the invention for measuring pH-values, and FIG. 2 shows another embodiment of measuring equipment according to the invention, partly in block diagram and with a separator shown in detail.

The measuring equipment shown in FIG. 1 comprises a measuring circuit which, as a measuring magnitude, produces an electric current, as well as a measured value utilizing device with an indicator which is connected to the measuring circuit via a cable through which the supply current for the measuring circuit is conducted from the utilizing device. For determining the pH-value of a liquid in a vessel 1, the measuring circuit has a glass electrode 2 and a reference electrode 3, e.g. a calomel electrode which constitute transducer means and, together with a temperature dependent resistor 4, which will be dealt with in greater detail below, are immersed in the liquid. The voltage set up between the electrodes, and which is determined by the pH-value of the liquid, is applied to an amplifier 5 which is designed in such a way that its supply current varies in dependence of the said voltage.

The amplifier 5 has as an input electrode the gate of a field effect transistor 8 which, in relation to the ground of the amplifier acts as source follower, in that its drain is kept at a constant voltage with the aid of a zener diode 9, while its source is connected to ground via the drain-source path of a corresponding field effect transistor 10, which operates as a constant current source circuit with the gate connected to the source. The field effect transistors 8 and 10 as well as the zener diode 9 are fed through a constant current source circuit 11.

The output voltage from the source follower 8 is applied to the base of a transistor 12 which, in conjunction with a transistor 13 is coupled as a differential amplifier fed with constant current through yet another constant current source circuit 14. The load impedance of the differential amplifier consists of the collector-emitter path of a transistor 15, the base-emitter voltage of which is held at the voltage across a diode-connected transistor 16, and consequently the load impedance has a high dynamic resistance. The second input of the differential amplifier is maintained at a constant voltage in relation to ground by means of a zener diode 17, to which a bias current is supplied via a resistor 18.

The output voltage from the differential amplifier is applied to the base of a transistor 19 which has an emitter resistor 20 and which is connected to another transistor 21 to form a Darlington pair having a high amplification factor. In order to avoid parasitic oscillation a frequency-compensating circuit comprising a resistor 22 and a capacitor 23 is inserted. The Darlington pair is supplied with a bias current via a constant current source circuit 24 and is, furthermore, connected with its output to the reference electrode 3 and to one terminal of the previously-mentioned temperature dependent resistor 4 immersed in the liquid in vessel 1. The other terminal of resistor 4 is connected via the zener diode 17 to the amplifier ground and is consequently maintained at a fixed level with respect to ground. Through the resistor 4 there will thus flow a current varying in dependence on the conduction of the Darlington pair 19, 21 controlled by the output voltage of the differential amplifier.

It will be seen that the circuit arrangement is an amplifier with a very strong degenerative voltage feedback, in which the feedback voltage, i.e. the voltage across the resistor 4, is applied in series with the input signal existing between the electrodes 2 and 3. This series combination of said two voltages is applied between the amplifier input, viz. the gate of field effect transistor 8, and cathode of Zener diode 17, viz. a point of a fixed level with respect to amplifier ground. The high input impedance which is due to the use of a field effect transistor in the input is, therefore, additionally increased, while the output impedance which occurs across the resistor 4, is low.

In the described circuit arrangement, in which the voltage on the source electrode of the source follower 8 follows the voltage of the glass electrode 2, and in which the voltages on the bases of the two transistors 12 and 13 are approximately equal due to the high amplification and the heavy degenerative feedback, the voltage across the temperature dependent resistor 4 will be very nearly equal to the voltage $(V_2-V_3)$ between the electrodes 2 and 3. Since, moreover, in the amplifier, constant current source circuits 11, 14 and 24 are employed through which the individual amplifier stages are fed with currents $I_{11}$, $I_{14}$ and $I_{24}$ respectively and as furthermore the last stage containing the Darlington pair 19, 21, passes a current component of a magnitude $(V_2-V_3)/R_4$ via resistor 4, it is seen that the supply current $I_{out}$ to the amplifier consists of the constant amount $I_0=I_{11}+I_{14}+I_{24}$ through said current source circuits plus the current through the resistor 4 or otherwise, expressed in an equation $I_{out}=I_{11}+I_{14}+I_{24}+(V_2-V_3)/R_4$. The last contribution is proportionate to the voltage between the electrodes 2 and 3, which is a measure of the pH-value of the liquid. Consequently, it is possible to transmit via a two-wire cable 25 the pH measurement result from the measuring circuit to the measured value utilizing device 26 at the same time as the measuring circuit is supplied with power via the same two-wire cable from a dc power supply in the device 26. In other words a change in the pH-value and consequently in the input signal of the amplifier will result in a corresponding change in the current feeding the amplifier through the cable 25. This cable can, in its simplest form, consist of two unscreened conductors 25 and be inexpensive. In the device 26, the component of the current in the cable 25 depending on the pH-value can be separated from the constant amount which via the constant current source circuits 11, 14 and 24 is consumed in the amplifier circuit 5, e.g., by subtracting in a subtraction stage, known per se and placed in the device 26, a current of a magnitude corresponding to the sum of the currents through the circuits 11, 14 and 24 from the total current passing through cable 25. The resulting current equal to the current component dependent on the pH-value can in the device 26 be displayed on an indicator instrument or recorded by a recorder, or it can be utilized as a control signal, e.g., for process control.

The temperature dependency of the resistor 4 which is immersed in the liquid and thus has good thermal contact with it, is expediently selected in conformity with the temperature dependency of the voltage between the electrodes 2 and 3, so that a change in temperature which will cause an increase in the voltage between the electrodes 2 and 3 and thus a corresponding increase in the voltage across the resistor 4, will cause also a corresponding increase in the resistance value of the resistor 4 and, consequently, an unchanged current through the resistor.

A galvanic separation between the measuring circuit and the device for utilizing the measured value is often desired, for example in the case where the measuring vessel 1 has an unknown potential. In order to maintain the measuring circuit at a floating potential in relation to the device, a separator is provided according to the invention, which can be inserted between the amplifier of the measuring circuit and the device and which, as the measuring circuit, is supplied with power from a dc power source in the device 26. An embodiment of a measuring equipment with such a separator is shown in FIG. 2 in block diagram, in which the block 27 containing the separator, is shown as a detailed circuit diagram.

The measuring equipment for measuring pH-values shown in FIG. 2 comprises a vessel 1 with measuring electrodes that are connected to an amplifier 5. These blocks may be constructed and connected as shown in FIG. 1. The supply current to the amplifier 5, which contains information about the pH-value of the liquid in vessel 1, is taken via the separator 27 and the cable 25 from the indicator device 26. The cable 25 and the indicator device 26 can likewise be of the same construction as in FIG. 1.

In block 27, the separator is shown in detail. It comprises an astable multivibrator of a type known per se with two transistors 28 and 29, of which the collectors and bases are cross-connected by means of two capacitors 30 and 31. Each of the collector circuits of the transistors 28 and 29 is divided up, each having two resistors, 32, 33 and 34, 35, respectively, and a diode 36 and 37, respectively, in order to obtain a rectangular wave form of the collector voltages. The base resistors 38 and 39 for discharging the capacitors 31 and 30, are connected to one another and the connecting point is via diodes 40 and 41, connected to the collectors of the transistors 28 and 29, the diodes 40 and 41 being oriented with their pass direction opposite to that of the collector base path of the corresponding transistor 28 and 29 respectively, so that the connecting point of resistors 38 and 39 is at any time, during operation, through a conducting diode 40 and 41 in connection with a collector of a blocked transistor 28 or 29. Should at any time, e.g. when switching on the circuit arrangement, both transistors 28 and 29 be in the conducting state simultaneously, the connecting point of resistors 38 and 39 would be held at a low voltage and thereby the resistors will be unable to transfer sufficient base current to the transistors to keep them conducting. There is thus ensured that the multivibrator is certain to start oscillating when it is switched on. For the adjustment of the pulse-to-space ratio, a potentiometer 42 is inserted, the tap of which is connected through a resistor 43 to the base of the transistor 28, whereby the discharge time of capacitor 31 can be changed by adjusting the potentiometer 42.

The multivibrator is fed with current through the cable 25 from the power source in device 26 and the square wave output pulses on the collectors of the two transistors 28 and 29 control the respective bases of two transistors 46 and 47 via RC-circuits 44 and 45, respectively, which transistors 46 and 47 hereby operate as switches and alternately conduct current from cable 25 through the two halves of the primary winding of a transformer 48, so that an inverter action for the current from cable 25 to the primary winding is obtained.

The alternating voltage which as a result of the inverter action is produced in the secondary winding which is galvanically separated from the primary winding is rectified in a bridge circuit 49 comprising four diodes and is smoothed out with a capacitor 50 to a D.C. voltage which causes the feeding current for the amplifier 5.

With the embodiment of the galvanic separator shown in FIG. 2, in which the astable multivibrator merely serves as control circuit for the two switching transistors and consequently operates with a constant current consumption from the power source in the device 26, and in which the switching transistors are alternately completely blocked and completely saturated and, therefore, do not introduce losses of any significance, it is achieved by employing a transformer in which each of the two halves of the primary winding and the entire secondary winding all have the same number of turns, that the component of the supply current to the amplifier 5 which is dependent on the pH-value of the liquid, is transformed with a transformation ratio of 1:1 and thus occurs with essentially the same magnitude on both sides of the galvanic separator, so that the sensitivity of the measuring equipment remains essentially unchanged by the insertion of the separator. It is thus possible — as in the case of FIG. 1, e.g. in a subtraction stage, to subtract from the total current in the cable 25, delivered by the power source in the device 26 as a feeding current to the amplifier 5 and the separator 27, a constant amount equal to the sum of the currents through the current source circuits 11, 14 and 24 and the current to the multivibrator, whereby the remaining amount of current is equal to the desired current component depending on the pH-value of the liquid, which can be utilized in the device 26 as already described.

It is evident that the invention is not restricted to the embodiment shown in the drawings, as many other embodiments and modifications are possible for an expert within the scope of the attached claims.

What I claim is:

1. A measuring equipment, especially for measuring the pH-value of a liquid, comprising transducer means for converting the quantity to be measured into an electric magnitude, amplifier means adapted for converting its input signal into a corresponding variation in its supply current, first electric conductor means connecting the transducer means to the amplifier means for conducting the electric magnitude as an input signal to the amplifier means, a measured value utilizing device having means for producing the supply current for the amplifier means and means for deriving a measurement result from the value of the supply current, second electric two-wire conductor means connecting the amplifier means to the utilizing device for conducting supply current from the latter to the former, and separator means forming part of the second conductor means for providing a galvanic separation of the amplifier means from the utilizing device.

2. A measuring equipment as claimed in claim 1, wherein the means for producing the supply current in the utilizing device is in the form of a direct current power supply, and wherein the separator means comprises a dc-ac-converter supplied from the direct current power supply generator, a transformer supplied from the dc-ac-converter, and an ac-dc-converter supplied from the transformer.

3. A measuring equipment as claimed in claim 2, wherein the dc-ac-converter comprises a self-running multivibrator, switching means inserted in the current path from the direct current power supply to the transformer, and means for controlling the switching of the switching means by the output voltage of the multivibrator.

4. A measuring equipment as claimed in claim 1, wherein the transducer means comprises a glass electrode and a reference electrode being arranged in a liquid the pH-value of which is being measured, and wherein the amplifier means comprises a feed-back loop for negative voltage feed-back, a temperature-dependent resistor being arranged in the liquid, included in the feed back loop.

5. A measuring equipment, especially for measuring the pH-value of a liquid, comprising transducer means for converting the quantity to be measured into an electric magnitude, an amplifier having a plurality of stages and having input terminals and supply terminals, means in the final stage of the amplifier, included in a circuit between the supply terminals of the amplifier and adapted for varying its internal resistence in dependence on the input signal applied to the input terminals of the amplifier, first electric conductor means connecting the transducer means to the input terminals of the amplifier, a measured value utilizing device having means for producing the supply current for the amplifier and means for deriving a measurement result from the value of the supply current, second electric two-wire conductor means connecting the supply terminals of the amplifier to the utilizing device, and separator means forming part of the second conductor means for providing a galvanic separation of the amplifier from the utilizing device.

6. A measuring equipment as claimed in claim 5, further comprising a number of constant current source circuits included in the amplifier and adapted to transfer constant supply current to the stages of the amplifier preceding the final stage.

* * * * *